(12) United States Patent
Yagasaki

(10) Patent No.: US 11,300,179 B2
(45) Date of Patent: Apr. 12, 2022

(54) METAL BELT FOR BELT-DRIVEN CONTINUOUSLY VARIABLE TRANSMISSION

(71) Applicant: HONDA MOTOR CO., LTD., Tokyo (JP)

(72) Inventor: Toru Yagasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 178 days.

(21) Appl. No.: 16/536,530

(22) Filed: Aug. 9, 2019

(65) Prior Publication Data

US 2020/0049231 A1 Feb. 13, 2020

(30) Foreign Application Priority Data

Aug. 10, 2018 (JP) .............................. JP2018-151603

(51) Int. Cl.
*F16G 5/18* (2006.01)
*F16G 5/16* (2006.01)
(Continued)

(52) U.S. Cl.
CPC ................. *F16G 5/18* (2013.01); *F16G 5/00* (2013.01); *F16G 5/16* (2013.01); *F16H 9/12* (2013.01); *F16H 9/18* (2013.01)

(58) Field of Classification Search
CPC ..... F16G 5/18; F16G 5/00; F16G 5/16; F16G 1/00; F16G 1/22; F16G 1/24; F16H 9/04; F16H 9/24
See application file for complete search history.

(56) References Cited

U.S. PATENT DOCUMENTS 4,552,548 A 11/1985 Hattori
4,826,473 A * 5/1989 Miyawaki ................. F16G 5/16
474/240
(Continued)

FOREIGN PATENT DOCUMENTS

CN 1720405 A 1/2006
CN 104822967 A 8/2015
(Continued)

OTHER PUBLICATIONS

Office Action dated Dec. 25, 2019, issued in counterpart JP application No. 2018-151603, with English translation. (9 pages).
(Continued)

*Primary Examiner* — Michael R Mansen
*Assistant Examiner* — Raveen J Dias
(74) *Attorney, Agent, or Firm* — Westerman, Hattori, Daniels & Adrian, LLP

(57) ABSTRACT

Provided is a metal belt for a belt-driven continuously variable transmission in which metal elements are capable of keeping the compliance value small even when defamed. Each metal element of the metal belt includes a body portion located radially inward of metal rings, an ear portion located radially outward of the metal rings, and a neck portion sandwiched by the pair of metal rings and connecting the body portion and the ear portion. At least one of a front surface and a rear surface of the metal element has a recess at a center region in a right-left direction of the ear portion, and the depth of the recess is larger than the amount of curving in a front-rear direction of the ear portion.

4 Claims, 11 Drawing Sheets

(51) Int. Cl.
*F16G 5/00* (2006.01)
*F16H 9/18* (2006.01)
*F16H 9/12* (2006.01)

(56) References Cited

U.S. PATENT DOCUMENTS

| | | | | |
|---|---|---|---|---|
| 6,409,620 B1* | 6/2002 | Yoshida | ................... | F16G 5/16 474/201 |
| 6,565,469 B1* | 5/2003 | Aoyama | ................... | F16G 5/16 474/240 |
| 2001/0049314 A1* | 12/2001 | Suzuki | ................... | B21D 53/14 474/248 |
| 2012/0021859 A1* | 1/2012 | Faes | ................... | F16G 5/16 474/240 |
| 2013/0174626 A1* | 7/2013 | Okubo | ................... | B21D 53/14 72/19.6 |
| 2015/0285336 A1* | 10/2015 | Ando | ................... | F16G 5/16 474/8 |
| 2016/0053852 A1* | 2/2016 | Yagasaki | ................... | F16G 5/16 474/272 |
| 2016/0102732 A1* | 4/2016 | Yagasaki | ................... | F16G 5/16 474/242 |
| 2017/0159752 A1* | 6/2017 | Sumida | ................. | B21D 35/001 |
| 2018/0128370 A1* | 5/2018 | Yagasaki | ............... | F16H 61/662 |
| 2018/0311719 A1* | 11/2018 | Yagasaki | ............... | B21D 35/001 |
| 2019/0301566 A1* | 10/2019 | Yagasaki | ................... | F16G 5/16 |

FOREIGN PATENT DOCUMENTS

| | | |
|---|---|---|
| CN | 105143713 A | 12/2015 |
| CN | 106461020 A | 2/2017 |
| JP | 6-34354 Y2 | 8/1993 |
| JP | 7-65640 B2 | 7/1995 |
| JP | 2001027288 A | 1/2001 |
| JP | 2004-225787 A | 8/2004 |
| JP | 2006-153089 A | 6/2006 |
| JP | 2006153089 A | 6/2006 |
| JP | 4505316 B2 | 7/2010 |

OTHER PUBLICATIONS

Office Action dated Nov. 2, 2020, issued in counterpart CN Application No. 201910627571.0, with English Translation. (8 pages).
Search Report dated Oct. 26, 2020, issued in counterpart CN Application No. 201910627571.0. (2 pages).

* cited by examiner

B<D

B1+B2<D1+D2

B+H<D

B1+B2+H<D1+D2

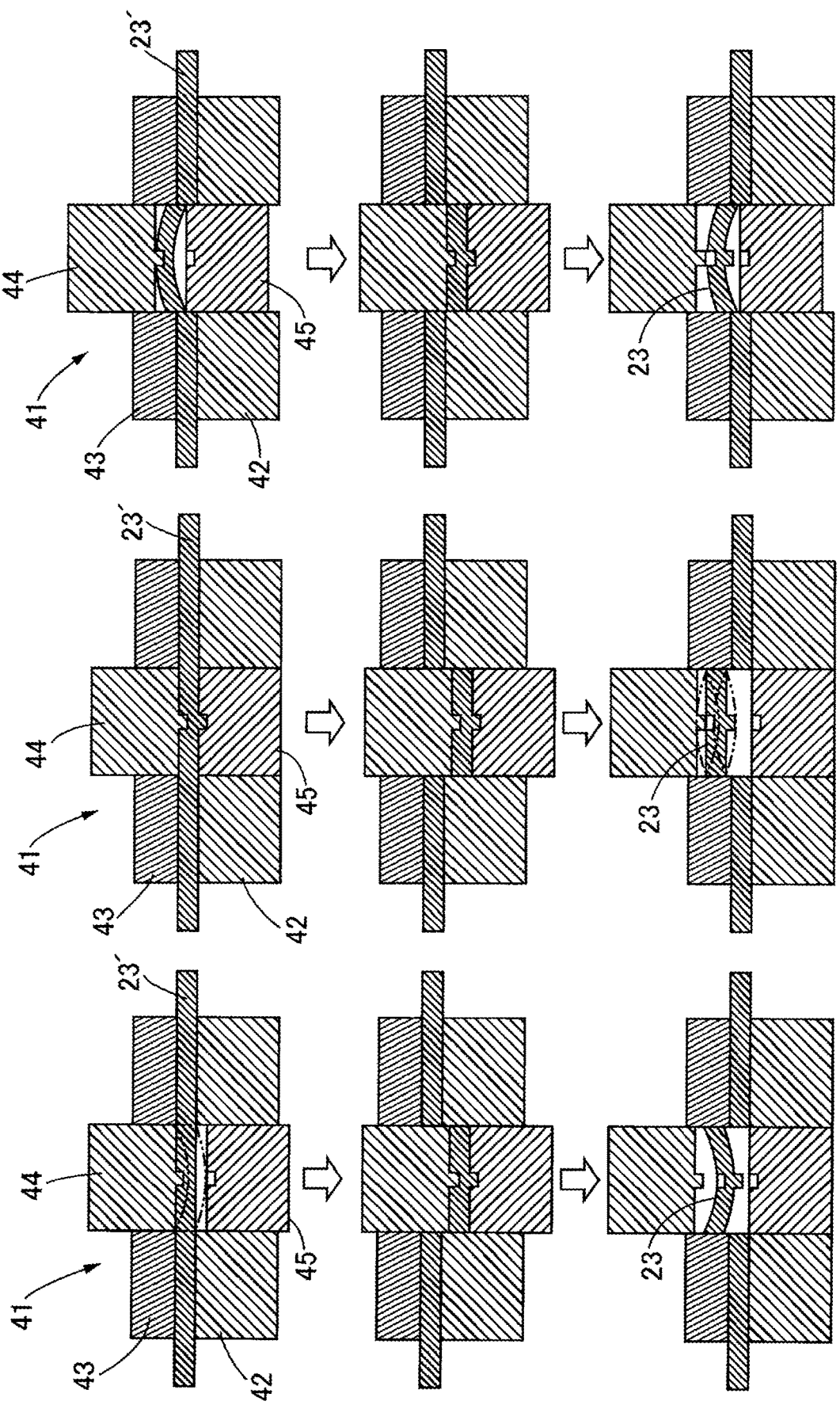

B<D

B>D

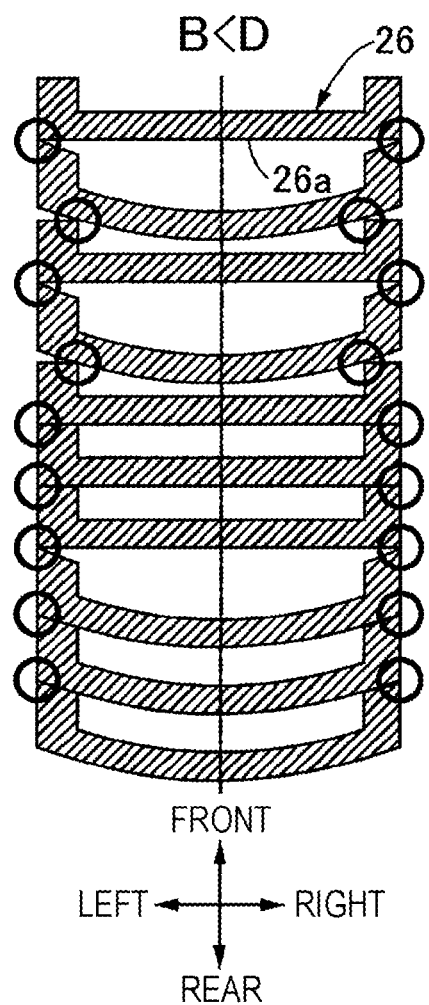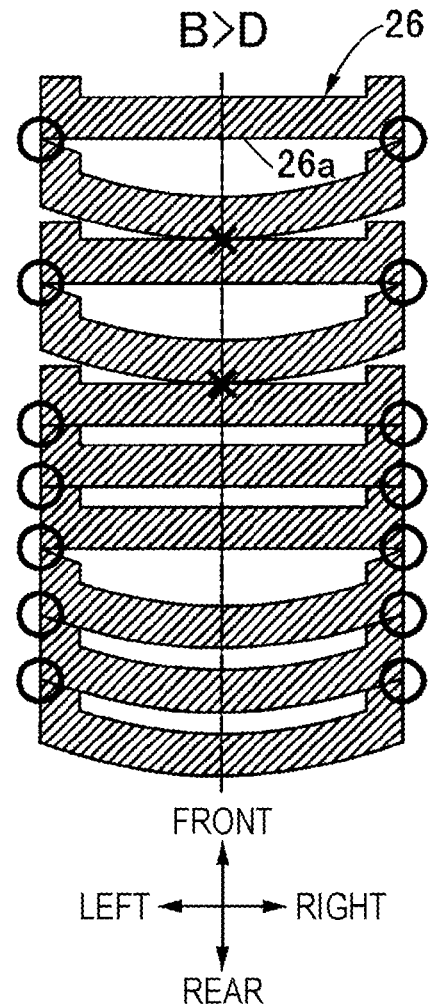

B<D

B>D

B1+B2<D1+D2

B1+B2>D1+D2

B+H<D

B+H>D $B1+B2+H<D1+D2$ $B1+B2+H>D1+D2$

METAL BELT FOR BELT-DRIVEN CONTINUOUSLY VARIABLE TRANSMISSION

CROSS REFERENCES TO RELATED APPLICATIONS

The present application claims priority under 35 U.S.C. § 119 to Japanese Patent Application No. 2018-151603, filed Aug. 10, 2018, entitled "Metal Belt for Belt-driven Continuously Variable Transmission." The contents of this application are incorporated herein by reference in their entirety.

BACKGROUND

1. Field

The present disclosure relates to a metal belt for a belt-driven continuously variable transmission, configured to be wound around pulleys, the metal belt including: a pair of metal rings; and a number of metal elements supported by the metal rings, each metal element including a body portion located radially inward of the metal rings, an ear portion located radially outward of the metal rings, and a neck portion sandwiched by the pair of metal rings and connecting the body portion and the ear portion.

2. Description of the Related Art

Japanese Examined Utility Model Registration Application Publication No. 5-34354 (hereinafter referred to as patent document 1) discloses a metal belt for a belt-driven continuously variable transmission including metal elements each famed in a shape in which a portion radially outward of the pitch line (the locking edge) has a recess located at the center in the right-left direction on one of the front and rear surfaces and dented from both ends in the right-left direction. This shape is intended to bring adjoining metal elements into contact with each other at both ends of the ear portions in the right-left direction, which makes the compliance value of the metal elements small, and which reduces the stress concentration in the metal elements and improves the durability.

Japanese Examined Patent Application Publication No. 7-65640 (hereinafter referred to as patent document 2) discloses a metal belt for a belt-driven continuously variable transmission including metal elements in each of which a portion around a projection protruded from the front surface of the ear portion is formed thinner than the other portions by press working or cutting. This structure is indented to bring adjoining metal elements into contact with each other at both ends of the ear portions in the right-left direction, which makes the compliance value of the metal elements small, and which reduces the stress concentration in the metal elements and improves the durability.

SUMMARY

In the above conventional techniques, it is assumed that the ear portion of the metal element is in a flat plate shape and has no defamation. In reality, in a press working process or a heat treatment process during production of the metal element, both ends in the right-left direction of the ear portion is inevitably defamed to curve in the front-rear direction relative to the center portion in the right-left direction. In the case where the ear portion of the metal element is deformed as described above, application of only the measure proposed in the above patent document 1 or 2 still causes a problem that adjoining metal elements come into contact with each other at the center portions in the right-left direction of the ear portions, making the compliance value larger and decreasing the durability.

There is a need to provide a metal belt for a belt-driven continuously variable transmission in which the metal elements are capable of keeping the compliance value small even when deformed.

A first aspect of the disclosure proposes a metal belt for a belt-driven continuously variable transmission, configured to be wound around pulleys, the metal belt including: a pair of metal rings; and a number of metal elements supported by the metal rings, each metal element including a body portion located radially inward of the metal rings, an ear portion located radially outward of the metal rings, and a neck portion sandwiched by the pair of metal rings and connecting the body portion and the ear portion, in which at least one of a front surface and a rear surface of the metal element has a recess at a center region in a right-left direction of the ear portion, and the depth of the recess is larger than the amount of curving in a front-rear direction of the ear portion. This configuration is preferably required in every and each metal element of the transmission belt and prevents metal elements adjoining in the front-back direction from coming into contact with each other at the center portions in the right-left direction even when the ear portion of the metal element is curved to one side in the front-rear direction. This keeps the compliance value of the metal elements small and prevents the occurrence of meandering and vibration, and also improves the durability of the metal elements.

A second aspect of the disclosure proposes the metal belt for a belt-driven continuously variable transmission, according to the first aspect, in which the front surface of the ear portion has a nose protruding frontward, and the rear surface of the ear portion has a hole which allows the nose to be inserted thereinto, and the depth of the recess is larger than the sum of the amount of curving in the front-rear direction of the ear portion and the height of a raised portion around the nose. This configuration makes it possible to keep the compliance value of the metal elements small positively even in the case where metal elements adjoining in the front-back direction are likely to come into contact with each other at the raised portion around the nose located at the center in the right-left direction of the ear portion.

A third aspect of the disclosure proposes a metal belt for a belt-driven continuously variable transmission, configured to be wound around pulleys, the metal belt including: a pair of metal rings; and a number of metal elements supported by the metal rings, each metal element including a body portion located radially inward of the metal rings, an ear portion located radially outward of the metal rings, and a neck portion sandwiched by the pair of metal rings and connecting the body portion and the ear portion, in which a front surface and a rear surface of the metal element each have a recess at a center region in a right-left direction of the ear portion, and the sum of the depths of the recesses is larger than the sum of the amounts of curving in a front-rear direction of the ear portion. This configuration is preferably required in every and each metal element of the transmission belt and prevents metal elements adjoining in the front-back direction from coming into contact with each other at the center portions in the right-left direction even in the case where metal elements the ear portions of which are curved to one side in the front-rear direction and metal elements the ear portions of which are curved to the other side in the front-rear direction are mixed. This keeps the compliance value of the metal elements small and prevents the occurrence of meandering and vibration, and also improve the durability of the metal elements.

A fourth aspect of the disclosure proposes the metal belt for a belt-driven continuously variable transmission, according to the third aspect, in which the front surface of the ear portion has a nose protruding frontward, and the rear surface of the ear portion has a hole which allows the nose to be inserted thereinto, and the sum of the depths of the recesses is larger than the sum of the amounts of curving in the front-rear direction of the ear portion and the height of a raised portion around the nose. This configuration makes it possible to keep the compliance value of the metal elements small positively even in the case where metal elements adjoining in the front-back direction are likely to come into contact with each other at the raised portion around the nose located at the center in the right-left direction of the ear portion.

Note that a driving pulley 13 and a driven pulley 14 in the embodiments correspond to the pulleys in the present disclosure.

BRIEF DESCRIPTION OF THE DRAWINGS

FIGS. 4A to 4C are diagrams for explaining a schematic structure of a punching apparatus and its operation.

FIGS. 5A to 5D are diagrams for explaining the effect in the case where the ear portion of the metal element is curved to one side in the front-rear direction (part 1) (a first embodiment).

DESCRIPTION OF THE PREFERRED EMBODIMENTS

First Embodiment

Hereinafter, a first embodiment of the present disclosure will be described with reference to FIGS. 1 to 7B.

Figure 1:
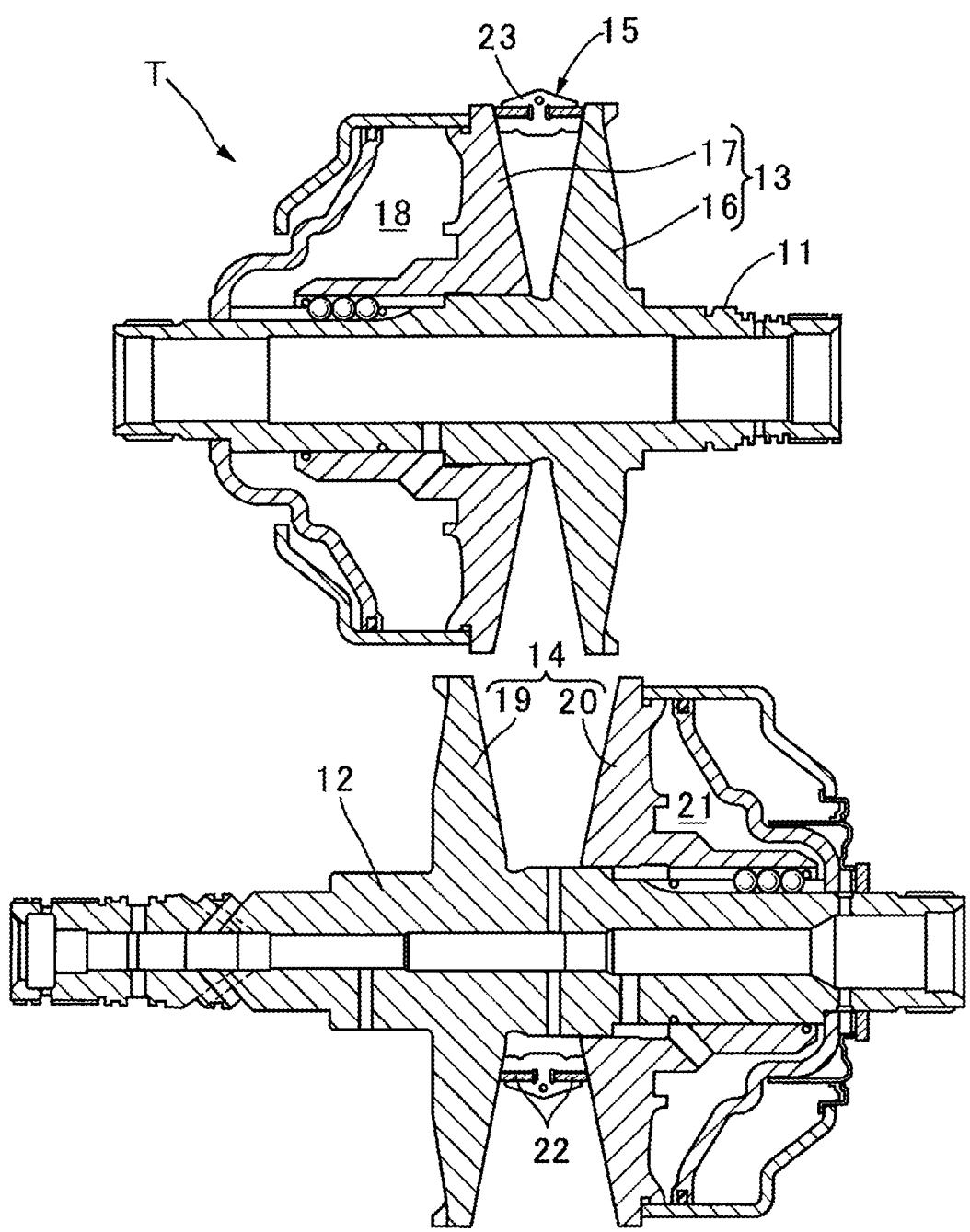
FIG. 1 is a diagram illustrating an overall structure of a belt-driven continuously variable transmission.

FIG. 1 illustrates a schematic structure of a belt-driven continuously variable transmission T used for automobiles. The belt-driven continuously variable transmission T includes a driving shaft 11 that is connected to the engine and a driven shaft 12 that is connected to the driving wheels, and an endless metal belt 15 is wound around a driving pulley 13 disposed on the driving shaft 11 and a driven pulley 14 disposed on the driven shaft 12. The driving pulley 13 includes a stationary pulley half 16 fixed to the driving shaft 11 and a movable pulley half 17 capable of moving closer to or away from the stationary pulley half 16, and the movable pulley half 17 is urged toward the stationary pulley half 16 by hydraulic pressure acting in an oil chamber 18. The driven pulley 14 includes a stationary pulley half 19 fixed to the driven shaft 12 and a movable pulley half 20 capable of moving closer to or away from the stationary pulley half 19, and the movable pulley half 20 is urged toward the stationary pulley half 19 by hydraulic pressure acting in an oil chamber 21.

Figure 2:
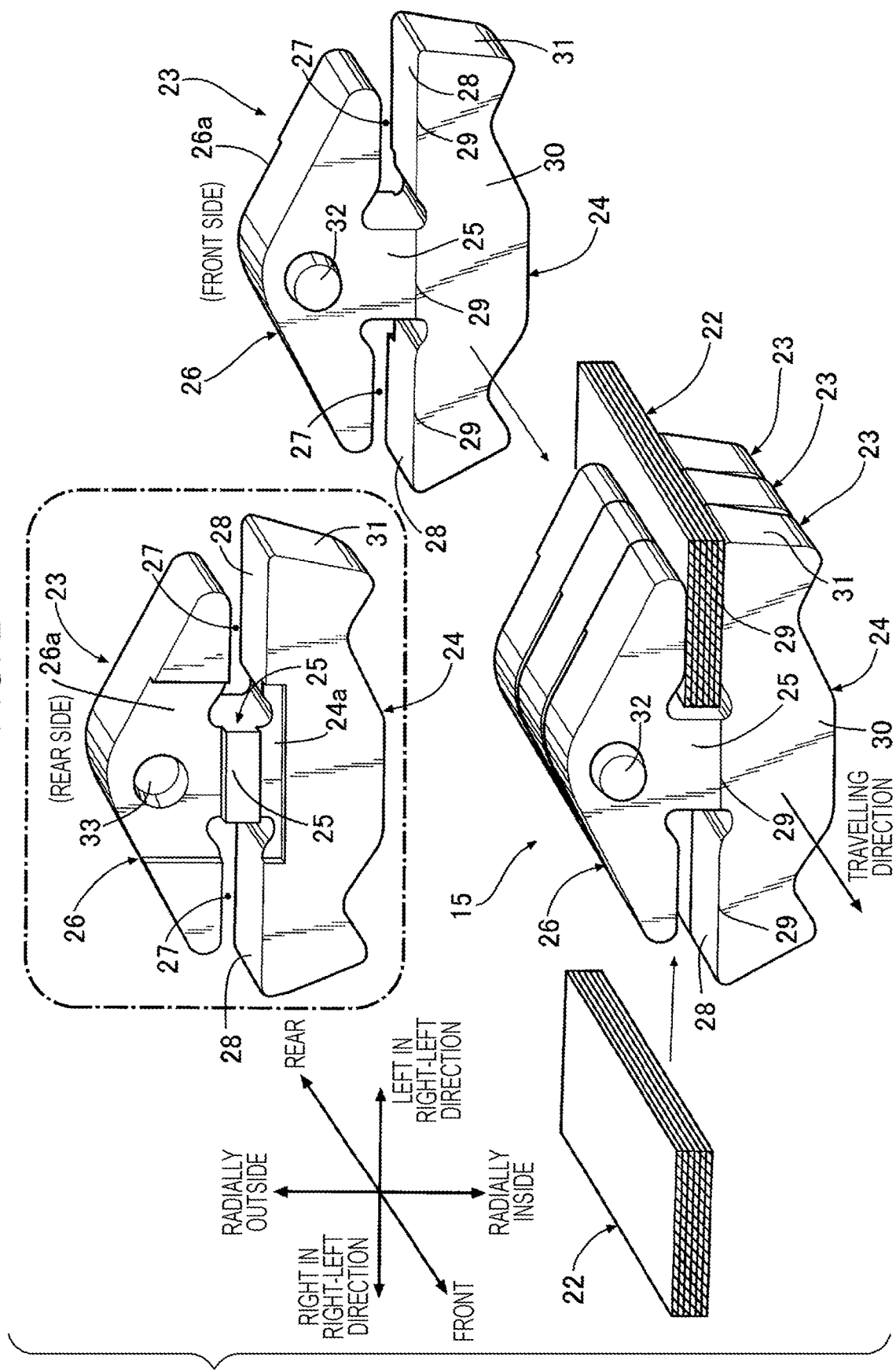
FIG. 2 shows perspective views of a metal belt and metal elements.

As illustrated in FIG. 2, a metal belt 15 includes a pair of right and left metal rings 22 and a large number of metal elements 23 supported by the metal rings 22. In this specification, the direction in which the metal belt 15 travels is defined as the front direction of the front-rear direction; in the state where the metal belt 15 is wound around the driving pulley 13 and the driven pulley 14, the outer peripheral sides of the driving pulley 13 and the driven pulley 14 are defined as the radially outward direction; and the direction orthogonal to the front-rear direction and the radial direction is defined as the right-left direction.

The metal element 23 manufactured from metal element material 23' includes a body portion 24 extending in the right-left direction, a neck portion 25 extending radially outward from the center in the right-left direction of the body portion 24, and an ear portion 26 in an approximately triangular shape, connected to the radially outward portion of the neck portion 25. The body portion 24, neck portion 25 and ear portion 26 form a pair of ring slots 27 therebetween, which are open outward in the right-left direction and into which the metal rings 22 are fitted. At each of the radially outer ends of the body portion 24 facing the ring slot 27 is a saddle surface 28 on which the inner peripheral surface of the metal ring 22 is seated. At each of the radially outer ends of the front surface of the body portion 24 is a locking edge 29 extending in the right-left direction. On the front surface of the body portion 24 is an inclined surface 30 inclined radially inward and rearward from the locking edge 29. The locking edge 29 is at the front edge of the saddle surface 28, and thus the locking edge 29 is radially outward of the front surface of the body portion 24.

At both right and left ends of the body portion 24 of the metal element 23 are formed pulley contact surfaces 31 which come into contact with the V surfaces of the driving pulley 13 and the driven pulley 14. On the front surface of the ear portion 26 of the metal element 23 is formed a nose 32 in a truncated cone shape which can be inserted into a hole 33 in a truncated cone shape famed on the rear surface of the ear portion 26.

A recess 26a that surrounds the hole 33 is formed at the center region in the right-left direction of the rear surface of the ear portion 26 of the metal element 23, and also, a recess 24a smaller than the recess 26a is formed at the center portion in the right-left direction and radially outward of the rear surface of the body portion 24, connected to the portion radially inward of the neck portion 25. Note that the recess 24a on the rear surface of the body portion 24 may be eliminated, or the recess 26a on the rear surface of the ear portion 26 is formed on the front surface in some cases or formed on both the front and rear surfaces in other cases.

Figure 3A:
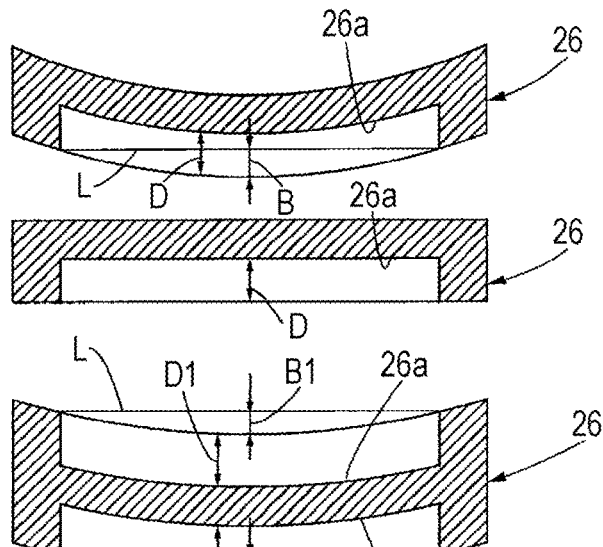
FIGS. 3A to 3D are diagrams schematically illustrating lateral cross sections of the ear portions of metal elements.
Figure 3B:
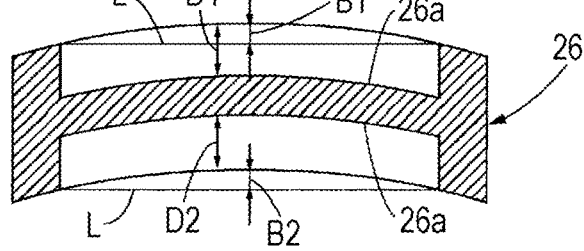

FIG. 3A schematically illustrates lateral cross sections of ear portions 26 of the metal elements 23. The ear portion 26 is curved to protrude rearward, in other words, the ear portion 26 is curved such that the center portion in the right-left direction is shifted rearward relative to both ends in the right-left direction of the ear portion 26. The recess 26a on the rear surface of the ear portion 26 has a depth of D, and the amount of curving in the front-rear direction of the ear portion 26 is B. The amount B of curving in the front-rear direction is defined as the amount of deviation/offset measured in the front-rear direction, which can be measured as a length in that direction between the line L and the center portion, centered in the right-left direction, of the curved rear surface of the ear portion 26. The line L is the straight line connecting between the right and left ends of the opening portion of the recess 26a. In a similar manner, the depth D1 and the amount B1 of curving on the front surface can be determined as shown in FIG. 3B.

As illustrated in FIGS. 4A to 4C, a punching apparatus 41 which forms and blanks out the metal element 23 from a metal element material 23' includes a die 42 and a sheet holder 43 which sandwich the metal element material 23' in the up-down direction and fix it; a main punch 44 which is slidably fitted in a hole in the same shape as the outline of the metal element 23, famed in the sheet holder 43 and comes into contact with the rear surface of the metal element 23; and a counter punch 45 which is slidably fitted in a hole in the same shape as the outline of the metal element 23, famed in the die 42 and comes into contact with the front surface of the metal element 23. The main punch 44 and the counter punch 45 are relatively movable in the up-down direction with respect to the die 42 and the sheet holder 43 by not-illustrated hydraulic pressure cylinders.

In this punching apparatus 41, the metal element material 23' for the metal element 23 is sandwiched and fixed between the die 42 and the sheet holder 43, and then the main punch 44 on the upper side is moved down relative to the counter punch 45 on the lower side to form the nose 32, hole 33, recesses 26a and 24a, and some other shapes on the metal element material 23' by press working. Subsequently, the main punch 44 and the counter punch 45 are integrally moved down relative to the die 42 and the sheet holder 43, blanking and separating the metal element 23 out of the metal element material 23' by shearing. Then, the main punch 44 and the counter punch 45 are moved back to the original positions, and the blanked metal element 23 is taken out.

Next, description will be provided for the reason why the front-rear curving B is caused in the ear portion 26 during the processing of the metal element 23.

As illustrated in FIG. 4A, in the case where the initial position of the counter punch 45 is deviated downward at forming of the metal element 23, the portion to be famed into the ear portion 26 of the metal element 23 is deformed to protrude downward at the moment when the lowered main punch 44 performs pressing work on the metal element material 23' because the initial position of the counter punch 45 is deviated downward. This deformation of the metal element 23 temporarily disappears while the metal element 23 is being fully sandwiched between the main punch 44 and the counter punch 45 and blanked. However, when the blanked metal element 23 is taken out of the punching apparatus 41, the deformation caused in the metal element 23 in the press working process reverts by the spring back phenomenon. Thus, the ear portion 26 always has a deformation protruding downward. This deformation may further increase in a subsequent heat treatment process.

As illustrated in FIG. 4C, in the case where the initial position of the counter punch 45 is deviated upward, the portion to be formed into the ear portion 26 of the metal element 23 is deformed to protrude upward at the moment when the metal element material 23' is sandwiched and fixed between the die 42 and the sheet holder 43 because the initial position of the counter punch 45 is deviated upward. This deformation of the metal element 23 temporarily disappears while the metal element 23 is being fully sandwiched between the main punch 44 and the counter punch 45 and blanked. However, when the blanked metal element 23 is taken out of the punching apparatus 41, the defamation caused in the metal element 23 in the sheet holding process reverts by the spring back phenomenon. Thus, the ear portion 26 of the metal element 23 always has a defamation protruding upward. This deformation may further increase in a subsequent heat treatment process.

As illustrated in FIG. 4B, in the case where the initial position of the counter punch 45 is not deviated either upward or downward, the finished metal element 23 should theoretically have no defamation. However, the variation in properties of the metal element material 23' in each process and a minute positional deviation of the initial position of the counter punch 45 cause a deformation protruding upward or downward in the ear portion 26 of the metal element 23.

In addition, because the main punch 44 has a forming pin for forming the hole 33 of the metal element 23, the metal element material 23' deforms when the forming pin comes into contact with or moves away from the metal element material 23', and this deformation further increases in a subsequent heat treatment process in some cases.

The amount B of curving in the front-rear direction caused in the ear portion 26 of the metal element 23 in production as described above is approximately 10 μm. Adjoining metal elements 23 in the cord portion on the power transmission side of the metal belt 15 push each other by a certain pushing force, and the amount of curving in the front-rear direction of the ear portion 26 caused by the pushing force can be calculated based on the area, thickness, and elastic modulus of the ear portion 26 and the pushing force. The amount of curving in the front-rear direction of the ear portion 26 caused by the pushing force acting between the metal elements 23 is approximately 0.7 μm, which is smaller than one tenth the amount B of curving in the front-rear direction caused in production described above. Thus, the amount of curving in the front-rear direction of the ear portion 26 caused by the pushing force is small enough to be ignored, so that the deformation of the metal element 23 caused by the pushing force will probably not change the positions of contact points between adjoining metal elements 23.

Meanwhile, multiple metal elements 23 come into contact with one another in the cord portion on the driving-force transmission side of the metal belt 15. In this state, because of the effects of the recesses 26a and 24a formed at the center portions in the right-left direction of the metal element 23, metal elements 23 adjoining in the front-rear direction come into contact with each other at both right and left end portions of the ear portions 26, preventing yawing of the metal element 23, so that the compliance value is small, and this prevents the occurrence of meandering and vibration of the metal belt 15. However, even with the metal elements 23 having the recesses 26a and 24a, if the ear portion 26 is curved in the front-rear direction, metal elements 23 adjoining in the front-rear direction come into contact with each other at the recess 26a of the ear portion 26, increasing the compliance value. This causes problems, such as the occurrence of the meandering and vibration of the metal belt 15 and the decrease in the durability of the metal element 23.

In the present disclosure, in the case where the ear portion 26 of the metal element 23 is curved in one direction as described with reference to FIG. 4A or 4C, depth D of the recess 26a in the ear portion 26 of the metal element 23 is made larger than the amount B of curving in the front-rear direction of the ear portion 26 of the metal element 23 as described with reference to FIG. 3A. This prevents metal elements 23 adjoining in the front-rear direction from coming into contact with each other at the recess 26a, keeping the compliance value small.

Figure 5B:
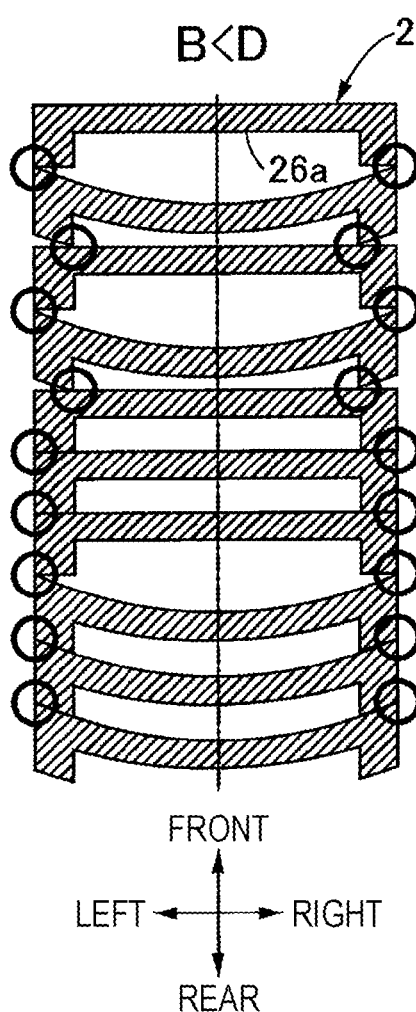
Figure 5A:
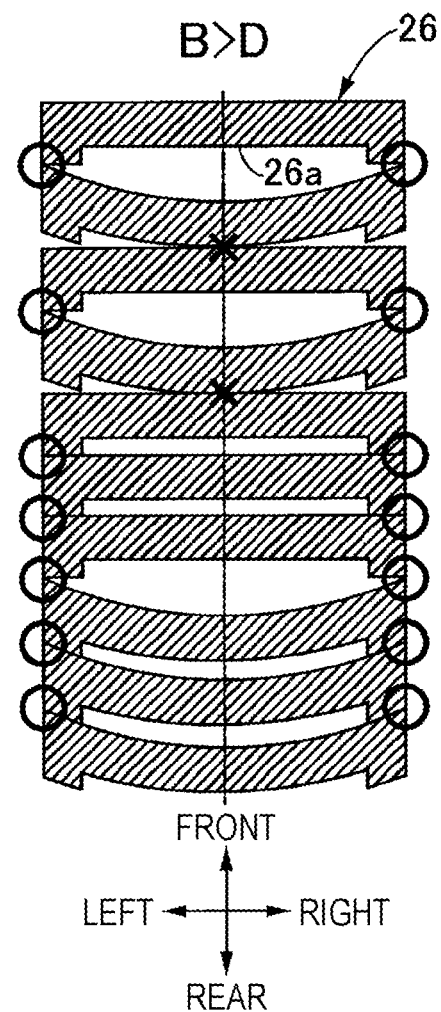

FIGS. 5A and 5B are diagrams for explaining the effect in the case where the ear portion 26 of the metal element 23 is curved to protrude rearward and where the recess 26a is famed on the rear surface of the ear portion 26. It is assumed here that there is no metal element 23 curved in the opposite direction although there is a variation in the amount B of curving in the front-rear direction of the metal element 23. It is also assumed that as a worst scenario, metal elements 23 in which the amount B of curving in the front-rear direction is zero and metal elements 23 in which the amount B of curving in the front-rear direction is the largest are mixed.

FIG. 5A illustrates a comparative example in which depth D of the recess 26a of the metal element 23 is smaller than the amount B of curving in the front-rear direction of the ear portion 26 of the metal element 23. In this case, most of the metal elements 23 are in contact with one another at both right and left end portions of the ear portions 26 (see the symbols "○"), but the front surfaces of metal elements 23 having no curving, located on the back sides and the rear surfaces of metal elements 23 curved to protrude rearward, located on the front sides are in contact with one another at the center portions in the right-left direction (see the symbols "x"), so that the state with a large compliance value occurs. On the other hand, FIG. 5B illustrates an embodiment in which depth D of the recess 26a of the metal element 23 is larger than the amount B of curving in the front-rear direction of the ear portion 26 of the metal element 23. In this case, all the metal element 23 are in contact with one another at both right and left end portions (see the symbols "○"), so that the compliance value is always kept small.

FIGS. 5C and 5D illustrate the case where the ear portion 26 is curved to protrude rearward and where the recess 26a is formed on the front surface of the metal element 23. FIG. 5C illustrates a comparative example in which depth D of the recess 26a of the metal element 23 is smaller than the amount B of curving in the front-rear direction of the ear portion 26 of the metal element 23. It can be seen that some metal elements 23 are in contact with one another at the center portions in the right-left direction (see the symbols "x"), and that the state where the compliance value is large has occurred. On the other hand, FIG. 5D illustrates an embodiment in which depth D of the recess 26a of the metal element 23 is larger than the amount B of curving in the front-rear direction of the ear portion 26 of the metal element 23. It can be seen that all the metal elements 23 are in contact with one another at both right and left end portions (see the symbols "○") and that the compliance value is always kept small.

Figure 6B:
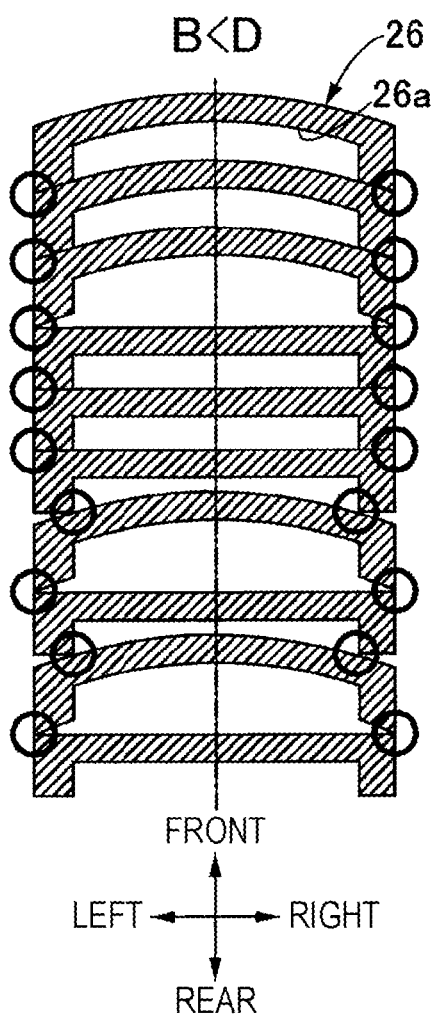
FIGS. 6A to 6D are diagrams for explaining the effect in the case where the ear portion of the metal element is curved to one side in the front-rear direction (part 2) (the first embodiment).
Figure 6A:
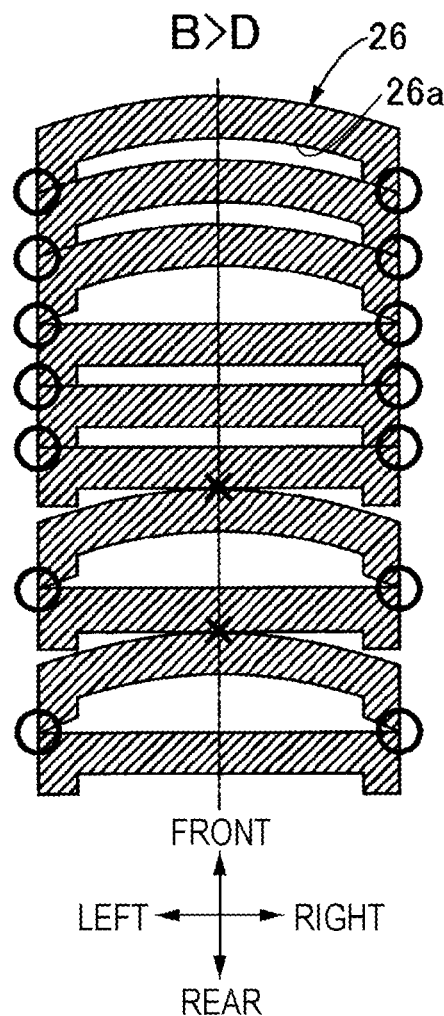
Figure 6D:
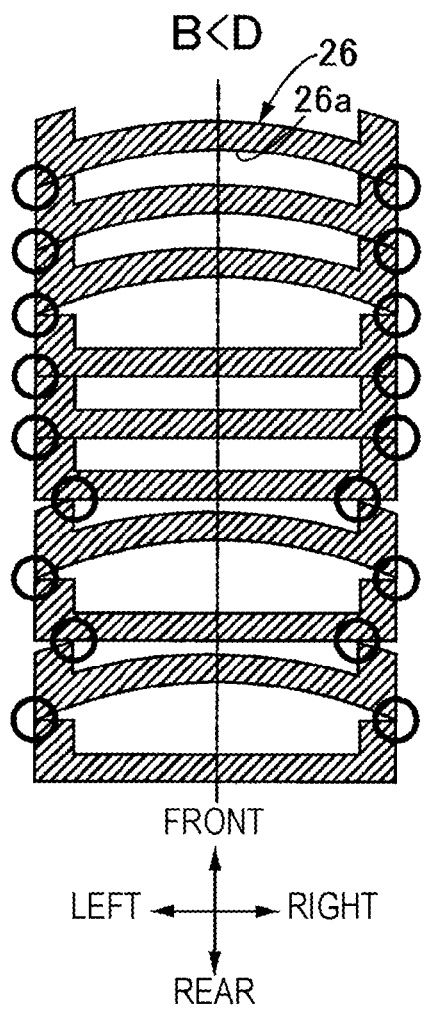
Figure 6C:
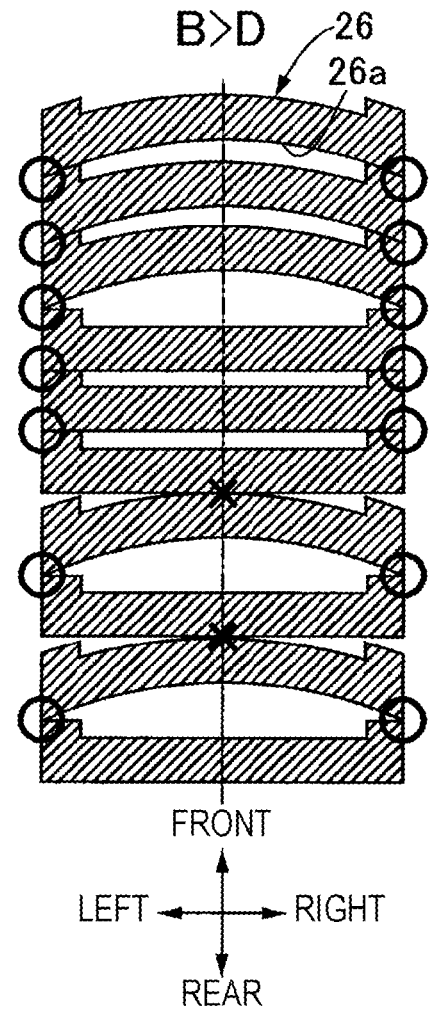

FIGS. 6A and 6B illustrate the case where the ear portion 26 is curved to protrude frontward and where the recess 26a is formed on the rear surface of the metal element 23; FIGS. 6C and 6D illustrate the case where the ear portion 26 is curved to protrude frontward and where the recess 26a is famed on the front surface of the metal element 23. In both cases, it can be seen that in the comparative examples, some metal elements 23 are in contact with one another at the center portions in the right-left direction (see the symbols "x"), and that in the embodiments, all the metal elements 23 are in contact with one another at both right and left end portions (see the symbols "○").

Figure 7B:
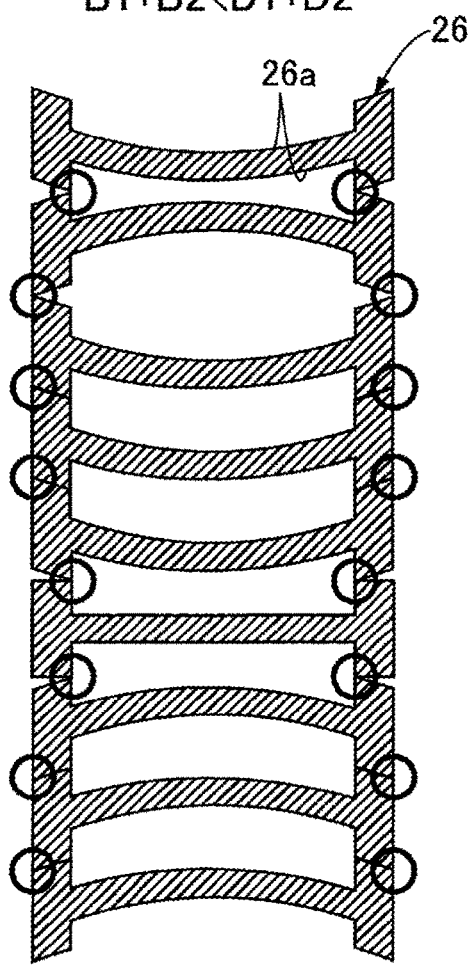
FIGS. 7A and 7B are diagrams for explaining the effect in the case where the ear portion of the metal element is curved to both sides in the front-rear direction (the first embodiment).
Figure 7A:
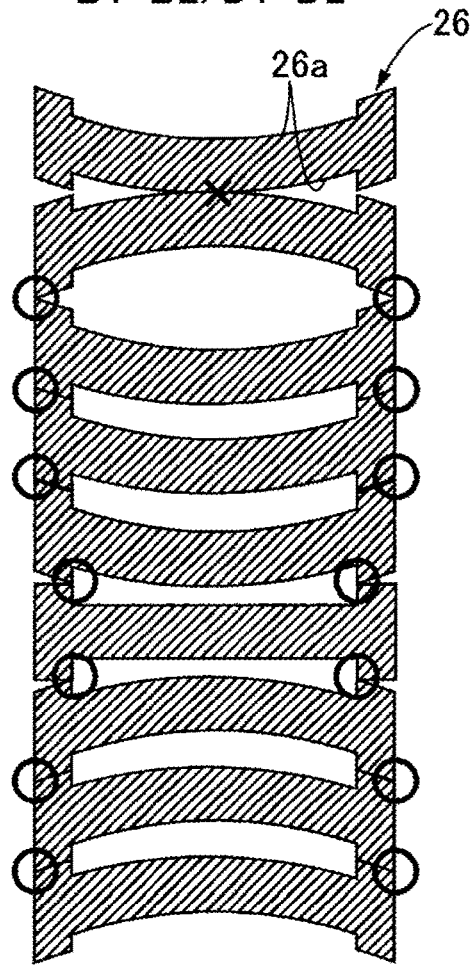

FIGS. 7A and 7B are diagrams for explaining the effect in the case where metal elements 23 having the ear portions 26 curved to protrude rearward and metal elements 23 having the ear portions 26 curved to protrude frontward are mixed as described with reference to FIG. 4B. Here, it is assumed that as a worst scenario, metal elements 23 in which the amount B of curving in the front-rear direction is zero and metal elements 23 in which the amount B of curving in the front-rear direction is the largest are mixed.

In the present disclosure, the sum D1+D2 of the depths of the recesses 26a on the front and rear surfaces of the ear portion 26 of the metal element 23 are made larger than the sum B1+B2 of the amounts of curving in the front-rear direction of the front and rear surfaces of the ear portion 26 of the metal element 23 as illustrated in FIG. 3B, in other words, B1+B2<D1+D2, to prevent metal elements 23 adjoining in the front-rear direction from coming into contact with one another at the recesses 26a and thus to keep the compliance value small.

FIG. 7A illustrates a comparative example in which the sum D1+D2 of the depths of the recesses 26a on the front and rear surfaces of the metal element 23 is smaller than the sum B1+B2 of the amounts of curving in the front-rear direction of the front and rear surfaces of the ear portion 26 of the metal element 23. In this case, many of the metal elements 23 are in contact with one another at both right and left end portions of the ear portions 26 (see the symbols "○"), but the front surface of a metal element 23 curved to protrude frontward, located on the back side and the rear surface of a metal element 23 curved to protrude rearward, located on the front side are in contact with each other at the center portions in the right-left direction (see the symbol "x"), so that the state where the compliance value is large occurs. On the other hand, FIG. 7B illustrates an embodiment in which the sum D1+D2 of the depths of the recesses 26a on the front and rear surfaces of the metal element 23 is larger than the sum B1+B2 of the amounts of curving in the front-rear direction of the front and rear surfaces of the ear portion 26 of the metal element 23. In this case, all the metal elements 23 are in contact with one another at both right and left end portions (see the symbols "○"), so that the compliance value is always kept small.

As has been described above, in the first embodiment, in the case where the ear portions 26 of all the metal elements 23 included in the metal belt 15 are curved in one direction, depth D of the recess 26a of the ear portion 26 is made larger than the amount B of curving in the front-rear direction of the ear portion 26; and in the case where metal elements 23 having the ear portions 26 curved to protrude rearward and metal elements 23 having the ear portions 26 curved to protrude frontward are mixed, the sum D1+D2 of the depths of the recesses 26a on the front and rear surfaces of the ear portion 26 is made larger than the sum B1+B2 of the amounts of curving in the front-rear direction of the front and rear surfaces of the ear portion 26. This configuration keeps the compliance value small, preventing the meandering of the metal belt 15 and the occurrence of noise, and also increases the durability of the metal element 23.

Second Embodiment

Figure 3C:
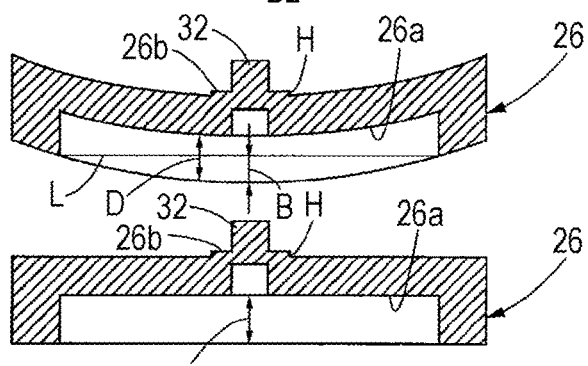

Meanwhile, the ear portion 26 of the metal element 23 has the nose 32 on the front surface and the hole 33 on the rear surface, and the nose 32 of the metal element 23 at the back is configured to be inserted into the hole 33 of the metal element 23 at the front. Since the nose 32 protruding from the front surface of the ear portion 26 is formed by press working, the base portion of the nose 32 is not formed to be a corner of straight lines, but a raised portion 26b protruding frontward is famed at the base portion, as schematically illustrated in FIG. 3C. In the case where such a raised portion 26b is formed at the base portion of the nose 32, the raised portion 26b of the metal element 23 at the back may come into contact with the edge of the hole 33 of the metal element 23 at the front before the metal element 23 at the front and the metal element 23 at the back come into contact with each other at both right and left end portions of the ear portions 26, and this would increase the compliance value.

In the second embodiment, height H of the raised portion 26b at the base portion of the nose 32 is taken into account in addition to depth D of the recess 26a of the ear portion 26 and the amount B of curving in the front-rear direction of the ear portion 26, and thus depth D of the recess is set such that the amount B of curving in the front-rear direction+raised height H<depth D of the recess. Since Depth D of the recess 26a is made larger according to raised height H as described above to cancel raised height H that increases the compliance value, the compliance value can be kept small more positively.

Figure 8B:
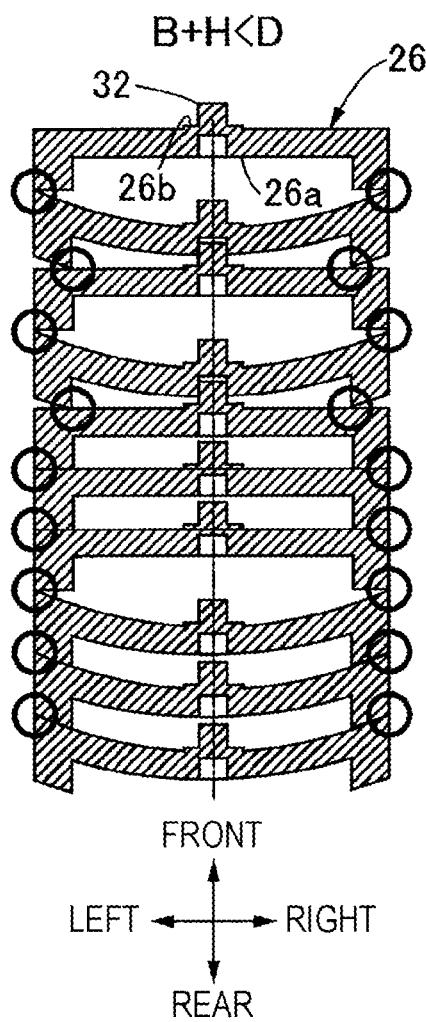
FIGS. 8A to 8D are diagrams for explaining the effect in the case where the ear portion of the metal element is curved to one side or both sides in the front-rear direction (a second embodiment).
Figure 8A:
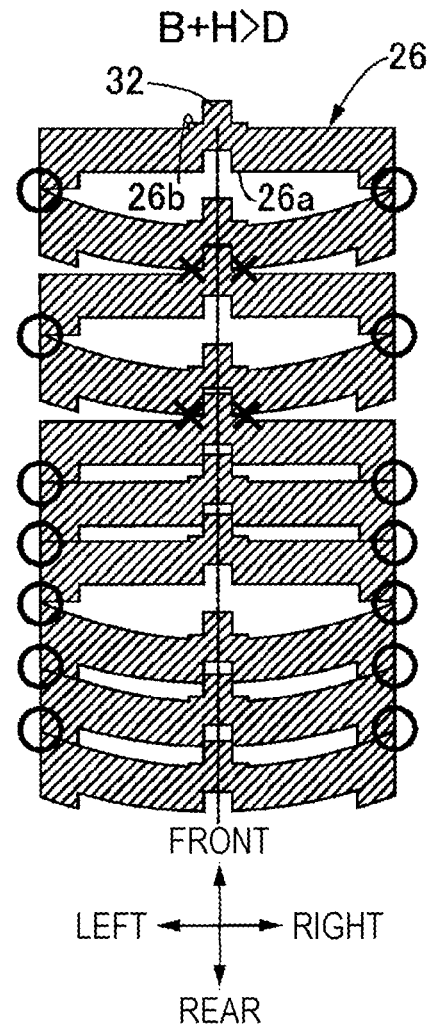

FIGS. 8A and 8B are diagrams explaining the effect in the case where the ear portion 26 of the metal element 23 is curved to protrude rearward and where the recess 26a is famed on the rear surface of the ear portion 26. FIG. 8A illustrates a comparative example in which the setting is made such that the amount B of curving in the front-rear direction+raised height H>depth D of the recess. Many of the metal elements 23 are in contact with one another at both right and left end portions of the ear portions 26 (see the symbols "○"), but the raised portions 26b at the base portions of the noses 32 on the front surfaces of the metal elements 23 having no curving, located at the back are in contact with the rear surfaces of the metal elements 23 curved to protrude rearward, located at the front, at the center portions in the right-left direction (see the symbols "x"). This causes a state where the compliance value is large. On the other hand, FIG. 8B illustrates an embodiment in which the setting is made such that the amount B of curving in the front-rear direction+raised height H<depth D of the recess. In this case, all the metal elements 23 are in contact with one another at both right and left end portions (see the symbols "○"), so that the compliance value is always kept small.

The same effect can be achieved also in the case where the ear portion 26 of the metal element 23 is curved to protrude rearward and where the recess 26a is formed on the front surface of the ear portion 26, in the case where the ear portion 26 of the metal element 23 is curved to protrude frontward and where the recess 26a is famed on the rear surface of the ear portion 26, and in the case where the ear portion 26 of the metal element 23 is curved to protrude frontward and where the recess 26a is famed on the front surface of the ear portion 26.

Figure 3D:
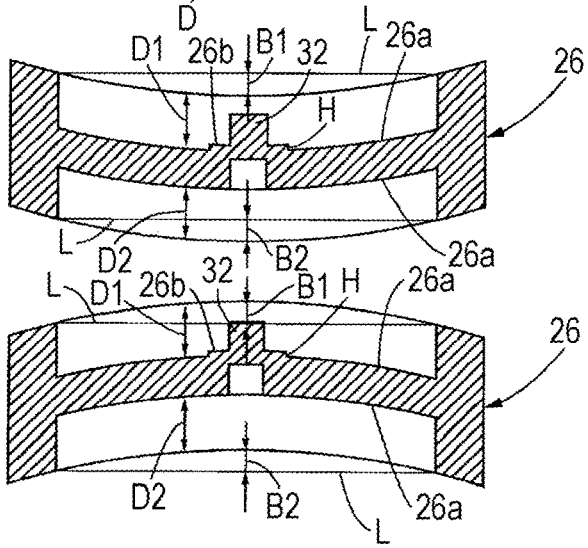
Figure 8D:
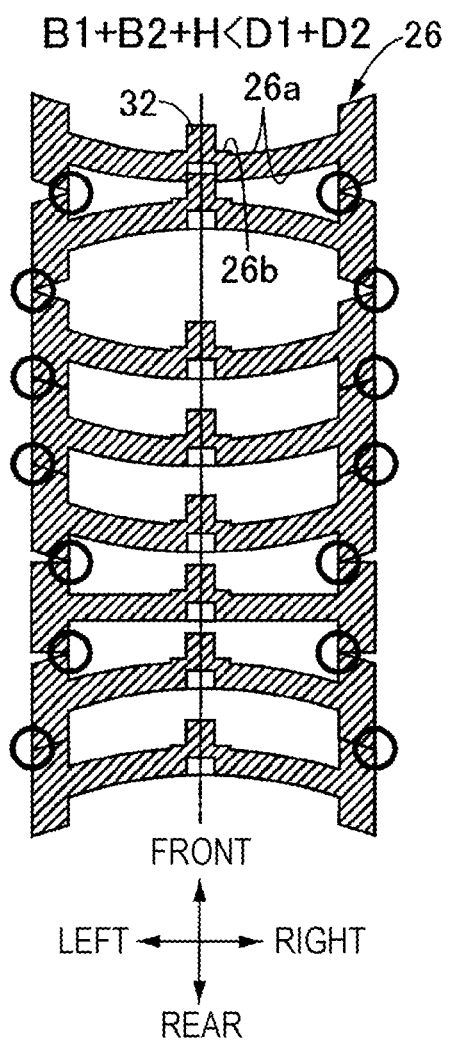
Figure 8C:
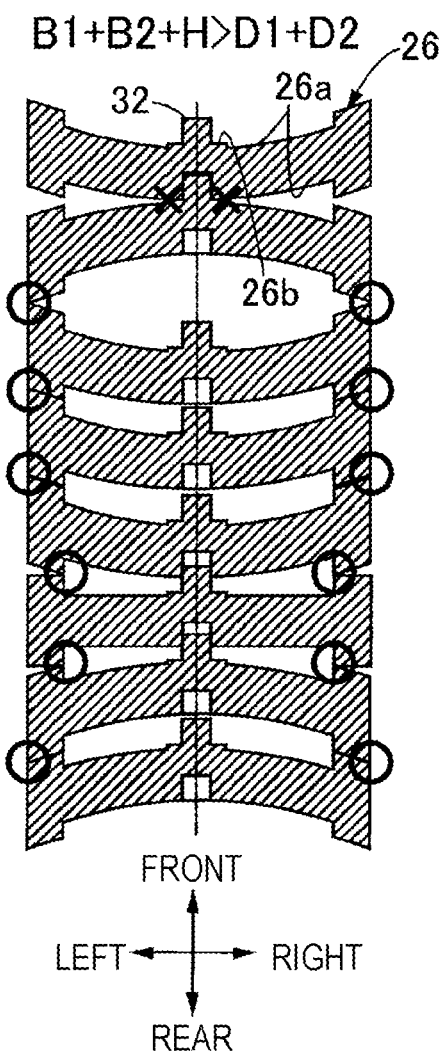

FIGS. 8C and 8D are diagrams for explaining the effect in the case where metal elements 23 having the ear portions 26 curved to protrude rearward and metal elements 23 having the ear portions 26 curved to protrude frontward are mixed. Compared to the first embodiment described with reference to FIGS. 7A and 7B, the raised portion 26b at the base portion of the nose 32 is likely to come into contact with the rear surface of the ear portion 26 of the metal element 23 at the front to an extent higher by raised height H than in the first embodiment. Thus, Depths D1 and D2 of the recesses 26a are set larger such that these values satisfy the formula B1+B2+H<D1+D2 as illustrated in FIG. 3D, to prevent the raised portion 26b at the base portion of the nose 32 of the metal element 23 at the back from coming into contact with the recess 26a of the metal element 23 at the front. This makes it possible to keep the compliance value small.

FIG. 8C illustrated a comparative example having a relationship of B1+B2+H>D1+D2, in which metal elements 23 adjoining in the front-rear direction are in contact with each other. On the other hand, FIG. 8D illustrates an embodiment having a relationship of B1+B2+H<D1+D2, from which it can be seen that the state where metal elements 23 adjoining in the front-rear direction does not occur.

As has been described above, in the second embodiment, the relationship that has to be satisfied by the amounts B, B1, and B2 of curving in the front-rear direction, raised height H, and depths D, D1, and D2 of the recess 26a is set with the raised portion 26b at the base portion of the nose 32 of the metal element 23 taken into account, so that the second embodiment makes it possible to keep the compliance value small more positively to prevent the meandering of the metal belt 15 and the occurrence of noise and also to increase the durability of the metal element 23.

Although the embodiments of the present disclosure have been described above, the present disclosure may be changed in design in various ways without departing from the gist thereof.

For example, although the metal element 23 in the embodiments has the recess 26a at the center portion in the right-left direction of the ear portion 26 and also has the recess 24a at the center portion in the right-left direction of the radially outward end of the body portion 24, the recess 24a in the body portion 24 is not essential. The metal element 23 only needs to have the recess 26a at the center portion in the right-left direction of the ear portion 26.

What is claimed is:

1. A metal belt configured to be wound around pulleys of a belt-driven continuously variable transmission, the metal belt comprising:
   a pair of metal rings; and
   a plurality of metal elements supported by the pair of metal rings and aligned with one another in a front-rear direction in which the metal belt travels, each metal element comprising a body portion located radially inward of the pair of metal rings, an ear portion located radially outward of the pair of metal rings, and a neck portion located between the pair of metal rings and connecting the body portion and the ear portion, wherein
   at least one surface of a front surface and a rear surface of said ear portion of each metal element has a recess at a center region in a right-left direction of the ear portion,
   the front surface of the ear portion of each metal element has a nose protruding frontward and a raised portion around a base portion of the nose, and the rear surface of the ear portion of each metal element has a hole which allows the nose of an adjacent metal element to be inserted thereinto, and a depth of the recess is larger than a sum of an amount of curving of said at least one surface in the front-rear direction of the ear portion and a height of the raised portion around the nose in the front-rear direction of the ear portion such that the raised portion is not in contact with a rear surface of the adjacent metal element.

2. The metal belt for the belt-driven continuously variable transmission according to claim 1, wherein
   the amount of curving is an amount of offset in the front-rear direction between a line L and a center portion of the curved front or rear surface of the ear portion, the line L being a straight line connecting between right and left ends of an opening of the recess in the right-left direction.

3. A metal belt configured to be wound around pulleys of a belt-driven continuously variable transmission, the metal belt comprising:
   a pair of metal rings; and
   a plurality of metal elements supported by the pair of metal rings and aligned with one another in a front-rear direction in which the metal belt travels, each metal element comprising a body portion located radially inward of the pair of metal rings, an ear portion located radially outward of the pair of metal rings, and a neck portion located between the pair of metal rings and connecting the body portion and the ear portion, wherein
   a front surface and a rear surface of the ear portion of each metal element each have a recess at a center region in a right-left direction of the ear portion,
   the front surface of the ear portion of each metal element has a nose protruding frontward and a raised portion around a base portion of the nose, and the rear surface of the ear portion of each metal element has a hole which allows the nose of an adjacent metal element to be inserted thereinto, and a sum of depths of the recesses is larger than a sum of amount of curving of the front surface in the front-rear direction of the ear portion, amount of curving of the rear surface in the front-rear direction of the ear portion, and a height of the raised portion around the nose in the front-rear direction of the ear portion such that the raised portion is not in contact with a rear surface of the adjacent metal element.

4. The metal belt for the belt-driven continuously variable transmission according to claim 3, wherein
   each amount of curving is an amount of offset in the front-rear direction between a line L and a center portion of the curved front or rear surface of the ear portion, the line L being a straight line connecting between right and left ends of an opening of the recess in the right-left direction.

* * * * *